United States Patent
Bench et al.

(10) Patent No.: US 6,908,035 B2
(45) Date of Patent: Jun. 21, 2005

(54) OPTICAL SECURITY SYSTEM

(75) Inventors: Amy L. Bench, Rochester, NY (US); David L. Patton, Webster, NY (US); Robert P. Bourdelais, Pittsford, NY (US); Cheryl J. Kaminsky, Webster, NY (US); John P. Spoonhower, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 95 days.

(21) Appl. No.: 10/391,130

(22) Filed: Mar. 18, 2003

(65) Prior Publication Data

US 2004/0182923 A1 Sep. 23, 2004

(51) Int. Cl.[7] .............................................. G06K 19/06
(52) U.S. Cl. ........................ 235/491; 235/454; 235/487
(58) Field of Search ................................ 235/380, 382, 235/382.5, 487, 490, 491, 454

(56) References Cited

U.S. PATENT DOCUMENTS

| | | | | |
|---|---|---|---|---|
| 3,643,216 A | * | 2/1972 | Greenaway et al. | ........ 382/115 |
| 4,837,425 A | | 6/1989 | Edwards | |
| 4,904,853 A | * | 2/1990 | Yokokawa | ................ 235/487 |
| 5,272,326 A | * | 12/1993 | Fujita et al. | ............... 235/487 |
| 5,283,431 A | | 2/1994 | Rhine | |
| 5,729,365 A | * | 3/1998 | Sweatt | ........................ 359/2 |
| 5,838,232 A | | 11/1998 | Kim et al. | |
| 6,176,430 B1 | * | 1/2001 | Finkelstein et al. | ......... 235/487 |

* cited by examiner

Primary Examiner—Karl D. Frech
(74) Attorney, Agent, or Firm—Frank Pincelli

(57) ABSTRACT

A system and security card comprising a support substrate having a diffuse layer disposed thereon, the support substrate having a substantially uniform light transmitting characteristic, the lens layer having a predetermined pattern area formed thereon such that when light is transmitted through the support substrate and the diffuse layer a unique pattern is produced that can be read from the light passing there through.

35 Claims, 9 Drawing Sheets

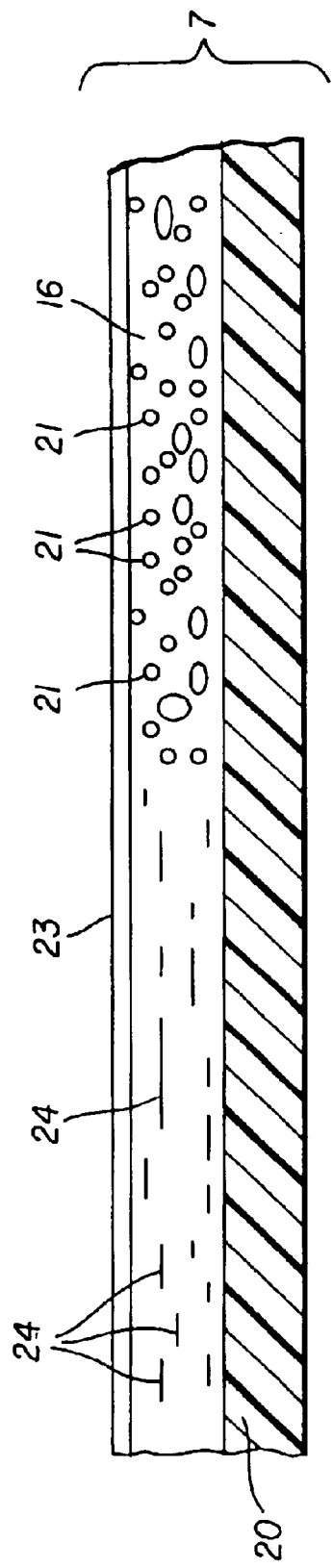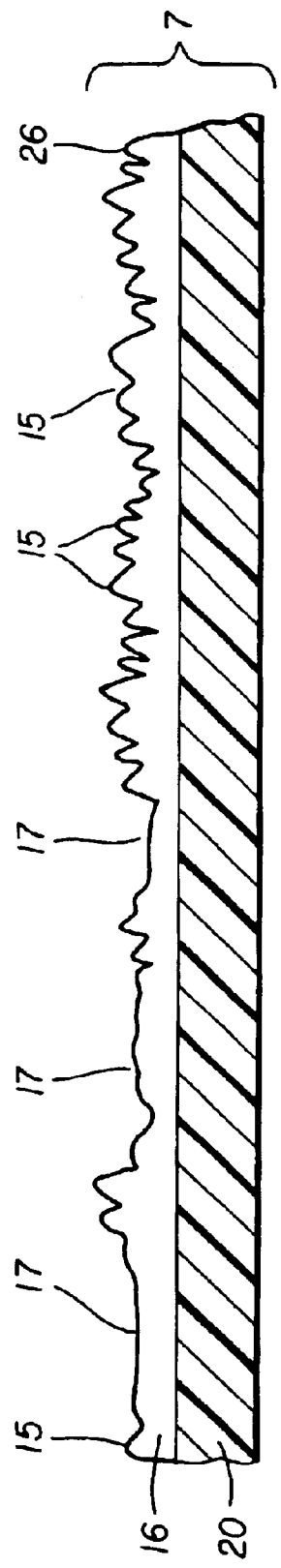

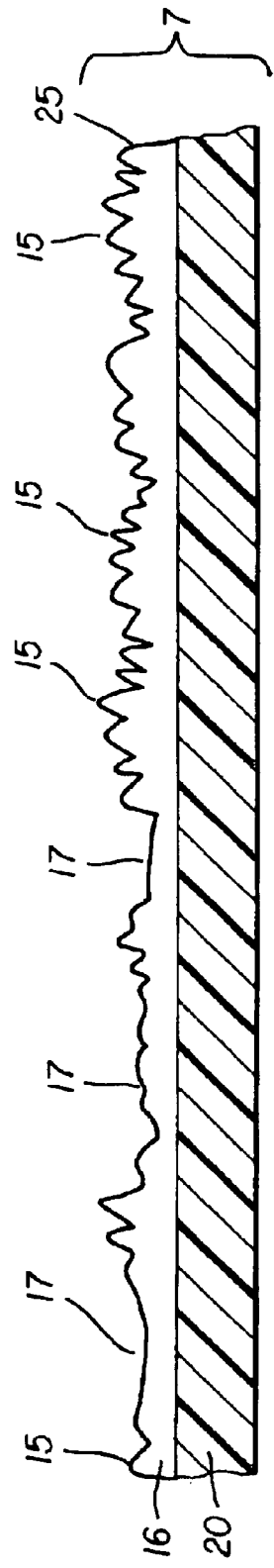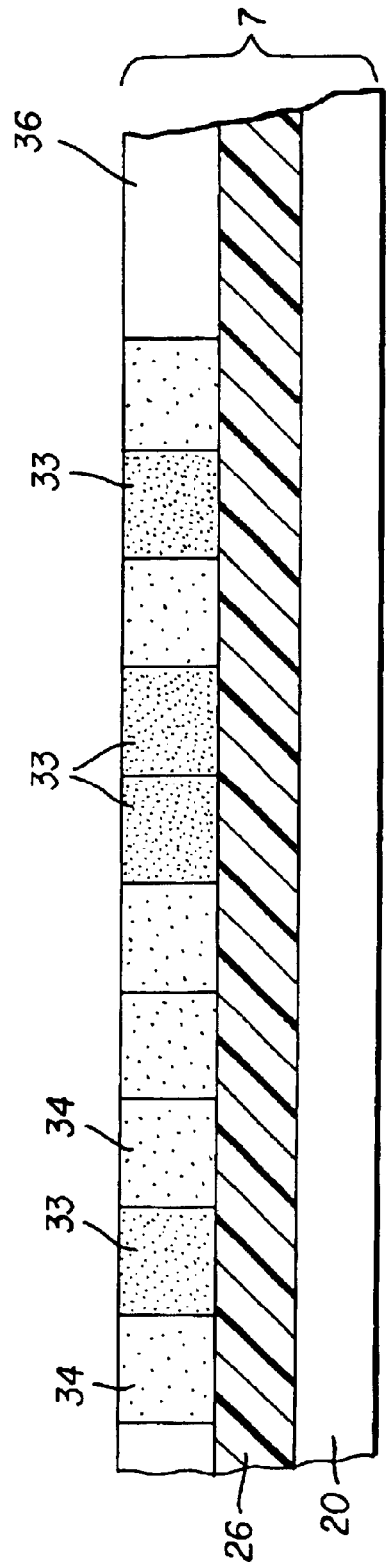

OPTICAL SECURITY SYSTEM

FIELD OF THE INVENTION

The present invention relates to a multi-purpose optical system, comprising a security key made of polymers, or dyes, which can be coded on-demand, with a randomly generated pattern.

BACKGROUND OF THE INVENTION

There are several methods for producing security keys. These methods disclose mechanical, magnetic and microprocessor devices, which have all been used to secure an entry point.

Mechanical locking systems, in which a key is used to turn a locking device between a locked state and an unlocked state, are very simple and inexpensive systems. However, people such as safebreakers can easily tamper with them. The keys can be copied conveniently in stores and locks are labor-intensive to change, both of which lower the security of a mechanical system.

Magnetic systems involve the use of magnets both in the key and the locking mechanism. Locks are locked or unlocked by the turning of the magnetic pieces within the locking mechanism. Magnetic systems can be problematic because of the degradation of the key (loss of magnetic force) in the presence of ferromagnetic objects or heat. They are also not high in security due to the limited number of magnetic combinations and the ease in copying a magnetic key.

Electronic devices use a keypad, a micro-processor and memory and are opened by depressing the correct sequence of numeric keys. The system is advantageous due to the lack of a separate key and large number of possible combinations; however, the system loses security as the keypad wears and the system is costly to implement.

There are several patents that attempt to address the problems above. U.S. Pat. No. 5,838,232 describes a multi-purpose locking device including a key made of a synthetic resin. The key includes a plurality of fine apertures and block members. Light receiving positions are set by the apertures not closed by the block members whereas light shielding positions are set by the apertures closed by the block members. A logic unit determines whether or not the correct key has been placed in the keyhole by comparing the pattern of apertures to a correct pattern.

U.S. Pat. No. 4,837,425 describes a security arrangement that includes a token in the form of a thin lamina that co-operates with a receptor. The token includes an optically readable pattern in the form of a bar code and a reflector that deflects the light modified by the bar code onto the receptor's optical sensor. The system includes a comparator to compare the light detected signal with an independently provided reference signal.

U.S. Pat. No. 5,283,431 describes an optical key security system that utilizes gradient refractive materials in an access key. The non-duplicable key has five separate encoded segments. The segments are made of an optically transmissive material (plastic or glass) with a gradient refractive index and diffusive properties, which bend light in ways which cannot be duplicated by conventional materials. Infrared beams are passed through the segments and an imaging system detects the pattern, which is sent to a microprocessor for pattern comparison.

Each of the aforementioned patents describes a unique key that is relatively inexpensive, difficult to duplicate, is not easily compromised by ferromagnetism or heat and has a large number of possible key patterns. These are important for temporary keys in places such as hotels, where keys are exchanged frequently. Hotel keys should be easily (simply yet securely) programmed by the management, having a large number of combinations, should be light weight, simple to dispense and low in cost. An advantage not currently found in the prior art, which would be beneficial to a broad spectrum of industries, is the capability of creating a key which is both difficult to duplicate and can be created on-demand. The present invention has this capability and as well provides a lightweight, inexpensive solution.

SUMMARY OF THE INVENTION

In accordance with the present invention there is provided a security card comprising:

a support substrate having a lens layer disposed thereon, the support substrate having a substantially uniform light transmitting characteristic, the lens layer having a predetermined pattern area formed thereon such that when light is transmitted through the support substrate and the lens layer a unique pattern is produced that can be read from the light passing there through.

In accordance with another aspect of the present invention there is provided a security card comprising:

a support substrate having a diffuse layer disposed thereon, the support substrate having a substantially uniform light transmitting characteristic, the diffuse layer having a predetermined pattern area formed thereon such that when light is transmitted through the support substrate and the lens layer a unique pattern is produced that can be read from the light passing there through.

In accordance with still another aspect of the present invention there is provided a method for forming a unique pattern on a security card having a support substrate diffuse layer disposed over the support substrate, the support substrate having a substantially uniform light transmitting characteristic, comprising the steps of:

creating a unique pattern on the diffuse layer by modifying the index of refraction of the diffuse layer in the unique pattern.

In accordance with still another aspect of the present invention there is provided a system for controlling access to a user, the system comprising:

a database for maintaining a plurality of unique security patterns each unique security pattern associated with a designated security card, each security pattern having a designed permission;

a security card having support substrate having a diffuse layer disposed over the substrate, the substrate having a substantially uniform light transmissive characteristic, the diffuse layer being modified in accordance with one of the associated unique security patterns, the security card is designed such that when light is transmitted through the substrate and the diffuse layer the associated unique security pattern can be read;

a for reading the security card if an associated unique pattern is present; and a computer system for taking the information read from the reader and comparing it with the information in the database to determined if the read associated unique pattern read will be allowed access.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2B is also taken across line A—A of FIG. 1 and illustrates the cross-section of a modified key in a bulk voided diffuser embodiment;

FIG. 2C is similar to FIG. 2A and FIG. 2B and illustrates yet another embodiment of a modified key containing a reflective layer;

FIG. 2D is similar to FIG. 2C and illustrates a further embodiment of the key containing a dye receiving layer;

FIG. 2E is similar to FIG. 2C and illustrates another embodiment of the key containing a fluorescent dye receiving layer;

DETAILED DESCRIPTION OF THE INVENTION

The invention has been described in detail with particular reference to certain preferred embodiments thereof, but it will be understood that variations and modifications can be effected within the spirit and scope of the invention. With reference to the drawings, a new and improved secure entry system will be described.

Figure 1:
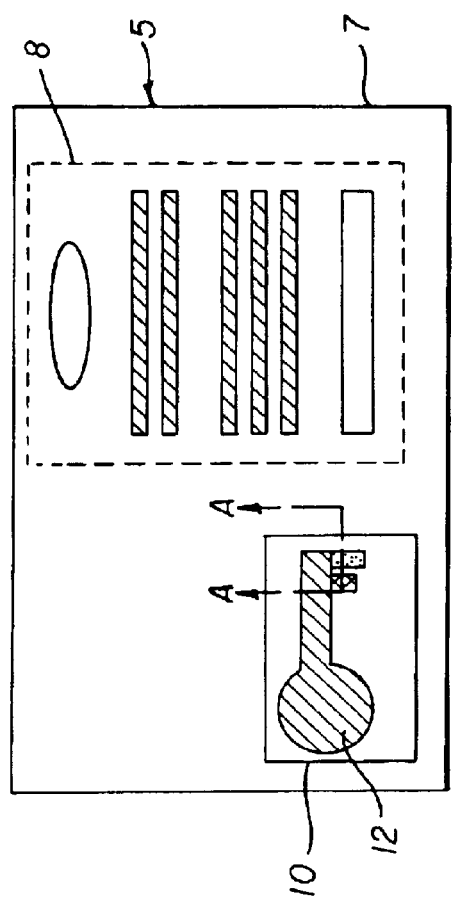
FIG. 1 is a schematic representation of the optical key made in accordance with the present invention.
Figure 2A:
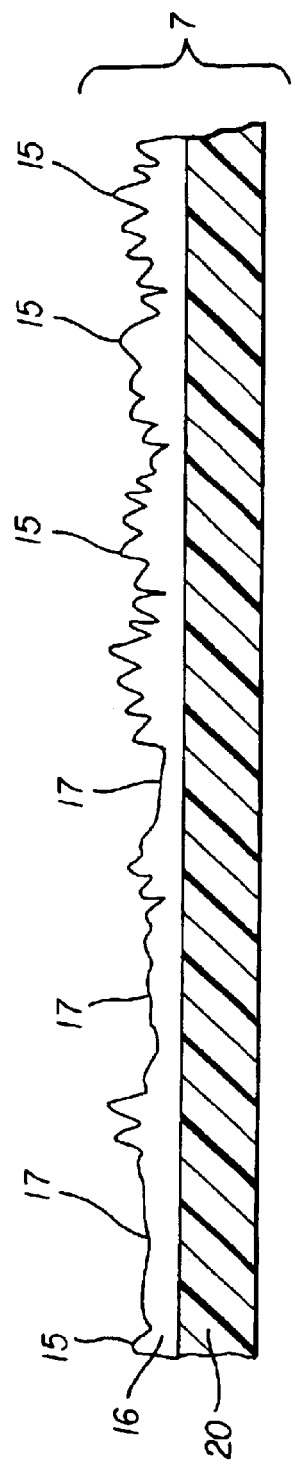
FIG. 2A is a drawing of the cross-section of the key taken across line A—A of FIG. 1. The cross-section represents a complex lens embodiment.

FIGS. 1 and 2A illustrate a key (5) comprised of a multi-layer material (7). The key (5) consists of a patterned area (10) a multi-layer material (7). The pattern area (10) contains a pattern (12). This patterned area (10) could extend to the perimeter of the key (5), or could be a portion thereof as illustrated. Outside of the patterned area (10), the key (5) might contain an area of printed information (8) specific to the key's purpose. If the key were to be used to gain entry into a hotel room, the printed information may include a logo and lettering of the hotel name and location, as well as phone number and room number information. If the key were to be used to gain access to a concert, the key might have the event name, location, date and seat number printed on it. In another embodiment, the patterned area (10) and the area of printed information (8) could be one and the same. Pattern (12) and printed information (8) creation are explained in subsequent paragraphs.

The multi-layer material (7) suitable for key (5) is fully disclosed in U.S. application Ser. No. 10/147,703, filed May 16, 2002, entitled LIGHT DIFFUSER WITH VARIABLE DIFFUSION, by Robert Paul Bourdelais and Cheryl Kaminsky, which is incorporated by reference herein, will be described here in the context of the invention. The multi-layer material (7) has a support layer/substrate (20), a diffuser layer (16) and may have additional layers as described in different embodiments. In the embodiment of FIG. 2A, the diffuser layer (16) comprises a plurality of micro-lenses, or lenslets (19) on the surface of the transparent polymeric film support (20). The lenslets (19) are shown as convex, but they can be concave or convex and are preferably randomly placed to provide a diffusion of light. The lenslets (19) can be located on both sides of the transparent polymer sheet and can vary in curvature, depth, size, spacing and positioning. In a preferred embodiment, they occur on the surface with an average frequency in any direction of between 44 and 3960 lenslets/mm. Most preferably, there are between 110 and 1080 lenslets/mm. Average lenslet (19) widths are preferably between 2 and 20 microns in the x and y direction and most preferably between 3 and 8 microns. Preferred polymers for the formation of the lenslets (19) include polyolefins, polyesters, polyamides, polycarbonates, cellulosic esters, polystyrene, polyvinyl reins, polysulfonamides, polyethers, polyimides, polyvinylidene fluoride, polyurethanes, polyphenylenesulfides, polytetrafluoroethylene, polyacetals, polysulfonates, polyester ionomers and polyolefin ionomers. Copolymers and/or mixtures of these polymers to improve mechanical or optical properties can be used. Preferably, the polymeric support (20) comprises an ester repeating unit. In other embodiments of the transparent polymeric film, the polymeric support (20) comprises a carbonate repeating unit, an olefin repeating unit, or cellulose acetate.

Referring now to FIG. 2B, in another embodiment, the multi-layer material (7) is a bulk diffuser. The bulk diffuser relies on a changing index of refraction, which occurs due to micro-voids (21) in the diffuser layer (16). Micro-voids (21) are voids that have a volume of less than 100 cubic micrometers. Void spaces (21) should comprise between 2 and 60%, preferably 30–50%, by volume of said diffuser layer (16). Micro-voids (21) formed from organic spheres are preferred because they are low in light scattering, have been shown to form substantially circular voids and are easily dispersed in polyester. As described in U.S. application Ser. No. 10/147,703, filed May 16, 2002, entitled LIGHT DIFFUSER WITH VARIABLE DIFFUSION, by Robert Paul Bourdelais and Cheryl Kaminsky, the size and shape of the voided diffuser layer (16) can be changed by proper selection of organic sphere size and amount. Substantially circular voids, whose major axis to minor axis is between 2.0 and 0.5, are preferred to provide efficient light diffusion. Adjacent to the voided diffuser layer (16) is a support layer (20). Also adjacent to the voided diffuser layer (16) is preferably one or more non-voided skin layers (23). Having the voids (21) in an internal layer adds to security, because the layer is not easily scratched or tampered with. The non-voided layer (23) of the composite sheet can be made of the same polymeric materials as the core matrix. Polyolefin or polyester are the preferred materials for voided diffuser (16) and non-voided (23) layers. An non-voided layer (23) could be, for example, a reflective layer (25), a dye receiving layer (26), or a fluorescent layer (36), which are described in FIG. 2C, FIG. 2D and FIG. 2E, respectively.

In another embodiment (not shown), the multi-layer material (7) is a surface diffuser. Surface texture in the surface diffuser could be formed from simple and or complex lenses (such as in the complex lens diffuser), but could also be prisms, pyramids, or cubes. A cross section of a surface diffuser would appear very similar to the cross-section in FIG. 2A, but with slight modification in shape of the diffuser layer (16). A combination of these multi-layer material (7) characteristics defines more embodiments of the key's (5) structure. For example, a bulk voided diffuser could be combined with a complex lens diffuser or a surface diffuser, allowing for even more security.

In another embodiment, the diffusion film could contain a reflective layer (25). In FIG. 2D the reflective layer is shown as integral to the top surface of the complex lenses. The reflection occurs at the surface of the complex lens film and is diffused by the reflective lenses on the surface. This is advantaged because the light is reflected off of the surface of the lenses instead of having to pass through multiple polymeric layers, making more efficient reflectivity. Another advantage is that the amount of reflectivity and diffusive reflectivity can be controlled by the thickness of the reflective layer on the surface of the complex lenses. In another embodiment, the polymeric film is reflective. This is preferred because the lenses can be applied directly onto the reflective base thus eliminating the need for a separate polymeric film and a reflective film. Changing the geometry of the lenses applied to the reflective base can easily alter the amount of diffusion for the reflection. In other embodiments, the reflective layer could also be adhesively adhered to the bottom of the polymeric film, or integral to the bottom of the polymeric film.

Preferably, the reflective layer comprises metal. Metals, such as gold or silver, have very efficient reflectivity that when used in the reflector, increases the efficiency of the reflector. Metal also adds strength, hardness and electrical conductivity properties to the reflection film. The reflective layer could also comprise an alloy. Using an alloy is preferred because the reflectance and mechanical properties can be tailored by using two or more metals with different properties. The reflective layer could comprise an oxide, such as titanium dioxide. Oxides are preferred because they have high reflectivity and scattering properties. The scattering properties of increase the diffusion efficiency of the diffuse reflector film. Incorporation of a reflective layer is more completely described in U.S. application Ser. No. 10/147,775, filed May 16, 2002, entitled LIGHT DEFLECTOR WITH VARIABLE DIFFUSE LIGHT REFLECTION, by Cheryl Kaminsky and Robert Paul Bourdelais which is hereby incorporated herein by reference in its entirety.

Still another embodiment of the invention is illustrated in FIG. 2E. FIG. 2E shows a multi-layer material (7) with a dye receiving layer (26) onto which a fluorescent layer (36) has been patterned. In a preferred embodiment the fluorescent layer (36) has a plurality of fluorescent dye pixels (33) that produce emitted light at a substantially different wavelength than the light received by the fluorescent layer (36). Fluorescent layer (36) has within it a plurality of light emitting or fluorescent dye pixels (33) and (34). The fluorescent dye pixels (33 and 34) may be of different types. They may possess different shapes or be comprised of different materials, so that when they receive light, they emit light in different portions of the optical spectrum. This received light is produced by the light source (52) in FIG. 7. The arrangement of the fluorescent dye pixels (33) and the alternative fluorescent dye pixels (34) that produce emitted light, produces a pattern that is sensed by the optical sensor (55) in FIG. 7. It is to be understood that the arrangement of the fluorescent pixels can be irregular with respect to the spatial arrangement; a regular array of fluorescent pixels (33 and 34) is not required. It is to be further understood that such fluorescent dye pixels (33 and 34) can be made from dyes (e.g. rhodamine 6G) or inks or other emitter materials such as phosphors. The essential requirement is that this layer emits light in response the light produced by the light source (50). The fluorescent layer can be created by a thermal printer or alternatively an ink-jet printer.

Figure 4:
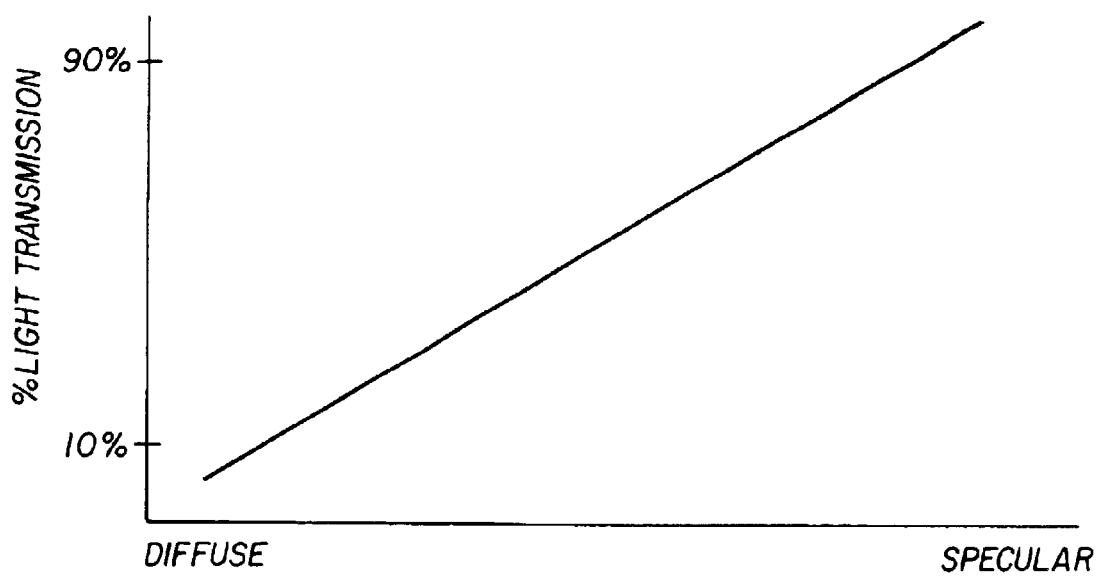
FIG. 4 is a plot of the range of light transmission, ranging from diffuse to specular values.

The diffuser layer (16) in any of the aforementioned embodiments, or combinations thereof, can be selectively "turned on" or "turned off," meaning the areas can be diffuse, less diffuse, or specular. "Diffuse" means that preferably less than 50%, but more preferably less than 10%, of the incident light is reflected on a reflective media, or is transmitted through a transmissive media. "Specular" means that greater than 50%, but more preferably greater than 90%, of the incident light is reflected on a reflective media, or is transmitted through a transmissive media. "Less diffuse" means that most preferably less than 90% and greater than 10% of incident light is reflected or transmitted, respectively. The difference between specular and diffuse should be enough to be detectable by visual or machine inspection. A visual of the range of specularity is seen in FIG. 4. Referring back to FIG. 1, this is of interest in the patterned area (10) of the key. A cross-section of FIG. 1 taken across line A—A is shown in FIG. 2A. In this figure, it is shown that specular areas (17) of the multi-layer material (7) have been created within the diffuse areas (15), resulting in a "pattern" (12). The specular areas (17) are only seen in the patterned area (10) of the key (5), which, in this view, is on the left-hand side of the drawing. The specular areas (17) are areas in which the lenses (19) have been flattened, post-production of the multi-layer material (7), using heat and/or pressure. When heat is applied to a polymeric film, the polymer diffusion element partially or fully melts and cools to form a new structure. In the case of the complex lens surface diffuser, heat will melt the lenses (19) (which are made by a thermoplastic) and will reform to create new shaped lenses or a smooth polymer surface. In a surface diffuser, the surface texture could also be "smoothed" by the application of heat. Voids (21) in the diffuser layer (16) (see FIG. 2B) would be collapsed by heat. Collapsed micro-voids (24) scatter less light within the diffuser layer (16), creating specular areas (17). In the complex lens case, the surface diffuser case and the voided diffuser case, heat can alter characteristics to create a relatively smooth diffuser layer (16) as compared to the non-altered areas that allows light to pass through specularly. Heat is a way to selectively turn parts of the multi-layer material (7) into a partially diffuse or specular sheet and can be applied in a very precise way to create specular dots, lines, patterns and text. Pressure can also be used to modify the diffusion properties on selective areas of the multi-layer material (7). When pressure is applied to a polymeric film the polymer diffusion element partially or fully compresses to form a new structure. In the case of the complex lens surface diffuser, the pressure will compress the lenses (19) and will reform them to create new flatter lenses (partially diffuse) or a smooth polymer surface (specular). Pressure can flatten areas on a surface diffuser and achieve the same effect. Pressure can also close the voids in a voided layer. Pressure can be applied in a very precise way to each of these embodiments, or a combination thereof, to create specular dots, lines, patterns and text.

Figure 5:
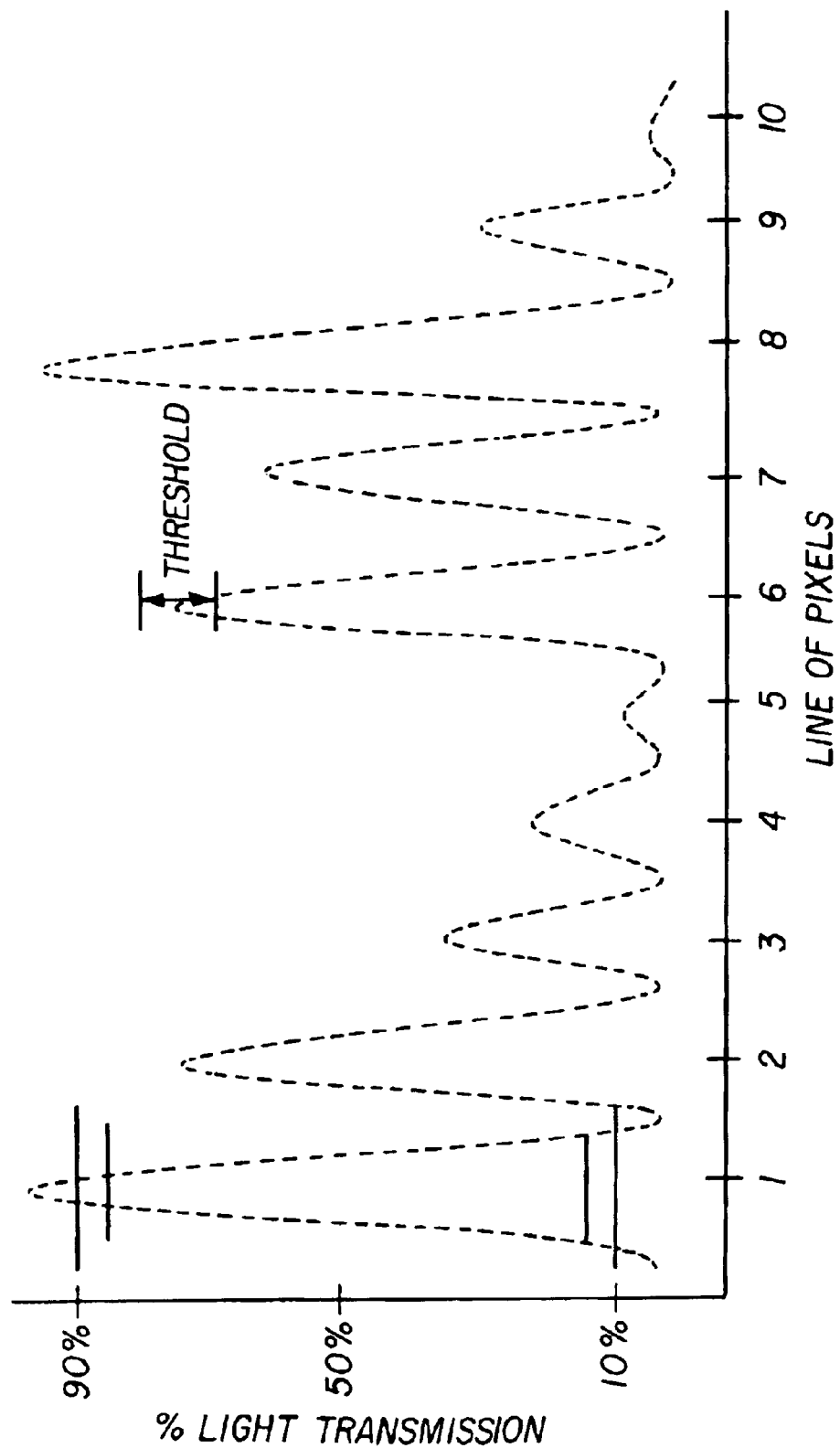
FIG. 5 is a plot of light transmission values versus "pixels" of the patterned area.

If a patterned area were broken into "pixels," FIG. 5 shows how a row of pixels can vary in specularity, each pixel being specular, diffuse, or less diffuse.

In another embodiment, the pattern (12) and or information (8) could also be written in color, to increase legibility. Dyes or nanopigments (inks) can be used to add color to the film. Dyes are preferred, as they are transparent. Dyes could be applied via a thermal printer and thus applied at the same time the pattern (12) and or information (8) is applied to the multi-layer material (7), which eliminates registration problems. In this case, the multi-layer material (7) would need a dye receiving layer (26). Dyes could also be included in the diffuser layer (16) or support layer (20). Application of color to is more completely described in U.S. application Ser. No. 10/147,659, filed May 16, 2002, entitled LIGHT DIFFUSER WITH COLORED VARIABLE DIFFUSION, by Cheryl Kaminsky, Robert Paul Bourdelais and John M. Pochan.

Figure 3:
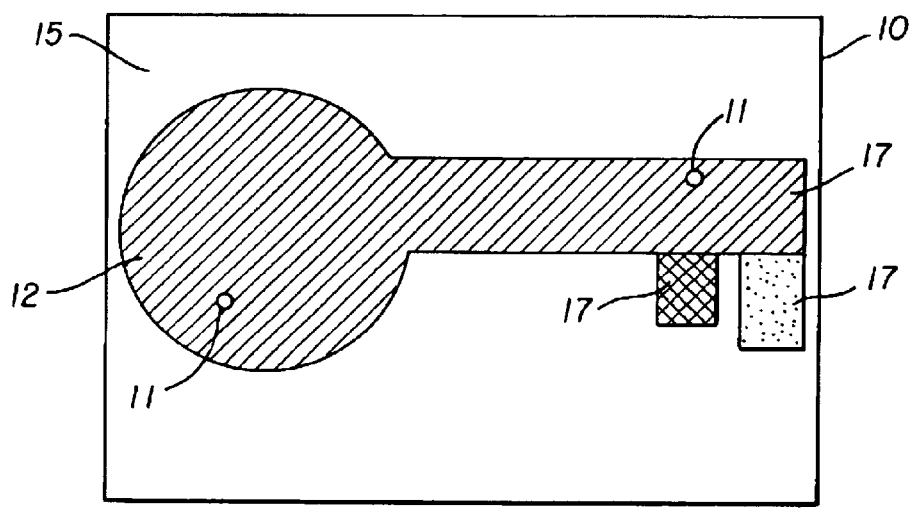
FIG. 3 is a schematic representation of the patterned area of the optical key.

FIG. 3 shows an enlarged pattern area (10). The dark area represents the pattern (12) where voids have been closed and or surface texture such as lenslets (19) melted. The pattern (12) has varying degrees of specularity (17), ranging from "specular" to "less diffuse." The outside area represents the diffuse area (15) where the diffuser layer (16) has not been altered.

FIG. 4 shows the range, from diffuse to specular, of light transmission through the multi-layer material (7). If the patterned area were subdivided into "pixels," or in a grid pattern of arbitrary size, we could map the transmission value of each pixel, as seen in FIG. 5. FIG. 5 shows a row of pixels extracted from an arbitrary (not shown) patterned area (10). Each pixel is plotted versus its respective percent light transmission. As an example, pixel 1 is specular, pixel 2 and 3 are less diffuse and pixel 4 is diffuse. A pattern may be written with more or less change in transmission per pixel, depending on the security level needed and the capability of the writing device (35). Each value is also within some tolerance, the range of which is dependent upon the accuracy and precision of the writing device (35). Within the pattern (12) of FIG. 3 are also orienting markers (11). These markers (11) are shown as dots, but can be of any form or in any orientation within the pattern (12). The markers (11) serve to aid in the analysis of the key's pattern and will be described further in the context of the optical key system.

Figure 6:
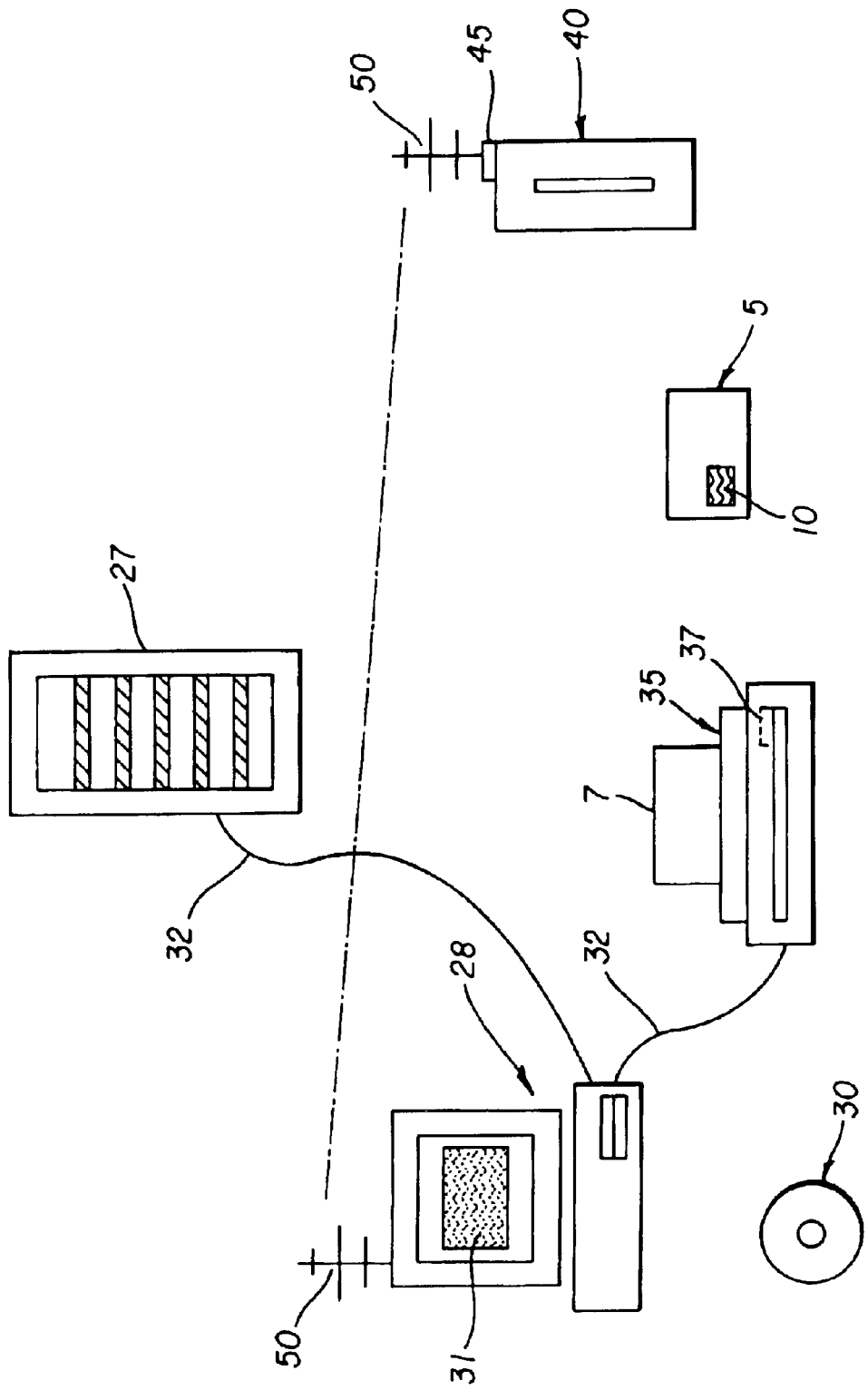
FIG. 6 is a schematic representation of the components in an optical key system made in accordance with the present invention.

FIG. 6 describes the optical key system according to the present invention. The process of creating varying degrees of specularity (17) on the multi-layer material (7) is done as follows. An algorithm (30) is used in a personal computer (28) to generate a digital pattern (31). The digital pattern (31) is sent to a writing device (35) via a hardwire or wireless connection (32). The writing device (35) accepts the multi-layer material (7) as writable media. The writing device (35) writes to an area of the multi-layer material (7), called the patterned area (10). The patterned area (10) can comprise the entire area of the multi-layer material (7), or a portion thereof. A writing head (37) within the writing device (35) applies heat and or pressure to the multi-layer material (7), based on the digital pattern (31), forming an optical pattern (12) defined by areas with different light emission properties. The pattern (12) can be created by heat and/or pressure, so any device that could deform the lenses (19) (or smooth the surface texture, or close the micro-voids) in a precise way could be used as a writing head (37). For example, a laser or microwave could be used to deform the diffuser layer (16). In this case, an absorbing dye would need to be included in the multi-layer material (7) embodiment, so that the energy would be absorbed, rather than transmitted, thus allowing for alterations to the diffuser layer (16). The algorithm-generated random pattern (31) is also sent from the computer (28) to the locking device (40), via an RF transmitter (50) or other wireless communication. Within the locking device (40) is a micro-processor (45), which receives the digital pattern (31). After the key (5) has been patterned in the writing device (35) and the digital pattern (31) is received by the lock's micro-processor (45), an optical method exits by which the key (5) can be used to deactivate (or activate as appropriate) the lock (40). This method is as follows.

Figure 7:
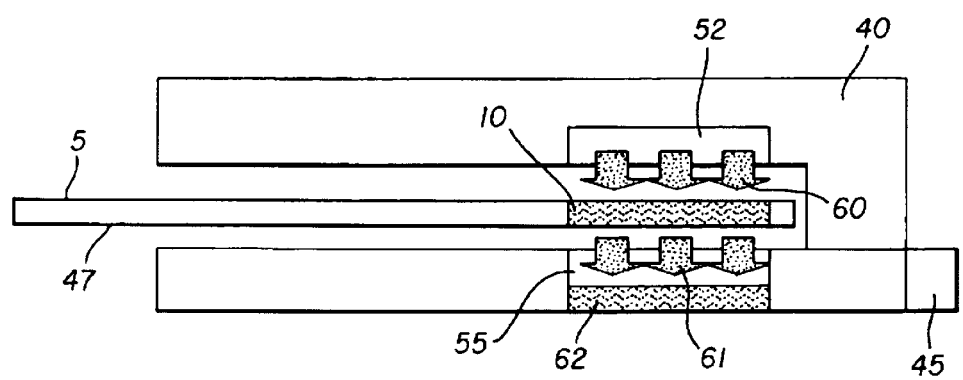
FIG. 7 is a schematic of a lock for use with an optical key made in accordance with the present invention.

FIG. 7 depicts a cross section of the lock (40) and key (5). The key (5) is placed in the slot (47) of the locking device (40). An optical source (52) can be always-on or triggered by a sensor that is activated by the presence of a key (5). Light (60) generated from the optical source (52), such as an organic laser array, is received by the patterned section (10) of the key. The light (60) is either transmitted or diffused by the multi-layer material (7), or excites fluorescence, relative to the key's pattern (12). The unique light pattern (61) is determined by the pattern (12) on the unique optical key (5). This unique light pattern (61) is imaged onto an optical sensor (55) such as a charge-coupled device, or CCD and creates an optical pattern signal (62). The optical sensor (55) communicates with the lock's micro-processor (45). The micro-processor (45) compares the digital pattern (31) it receives from the personal computer (28) with the optical pattern signal (62) it receives from the optical sensor (55). The orienting markers (11) (see FIG. 3) on the key provide a reference point by which the digital (31) and optical (62) patterns can be compared. For example, the micro-processor would compare patterns based on the location of the orienting markers (11). That way, card (5) insertion would not have to be physically exact, because the sensor (55) would be looking for a pattern (31,62) based on reference, not exact, points. If the two patterns match, the lock (40) is deactivated. If the patterns do not match, the locking device (40) remains locked or current state. The lock (40) may have an additional indication device, such as a blinking light, or a sound, to let the user know of the key's (5) acceptability. In the event that a master key is needed, the optical sensor (55) may need to recognize an additional pattern (13). The lock (40) can be programmed to do so, via the personal computer/micro-processor connection, allowing entry to either a unique key holder or a master key holder. Either key could also be programmed to deactivate the lock (40) only under certain circumstances, such as during a certain time period. This could also be determined by the user of the personal computer (28). This would allow the patron, for example, access during his entire length of stay, but someone such as a housekeeper only during designated hours. The key (5) may also be equipped with more than one pattern. Again using the hotel application, if the patron wanted access to the hotel pool or weight room, an additional access pattern (13) could be created on his key (5), with privileges separate from that of the hotel room access pattern. Each access point could have a different configuration regarding pattern area (10) and light source (52)/optical sensor (55) placement, so that the correct pattern is read at the correct locking site. Or, patterns and sensors (55) could be color-specific. The multi-layer film (7) accepts color dyes and pigments. Therefore, the optical sensor (55) can be programmed to recognize not only a pattern (12), but light of a specific wavelength. That way, multiple patterns, each with a unique color, could be written to the key (5) within the same patterned area (10) and no interference between each pattern would occur. Therefore, optics and pattern area locations could remain constant for each key (5) and each locking mechanism (40) for a given optical key system.

Figure 8:
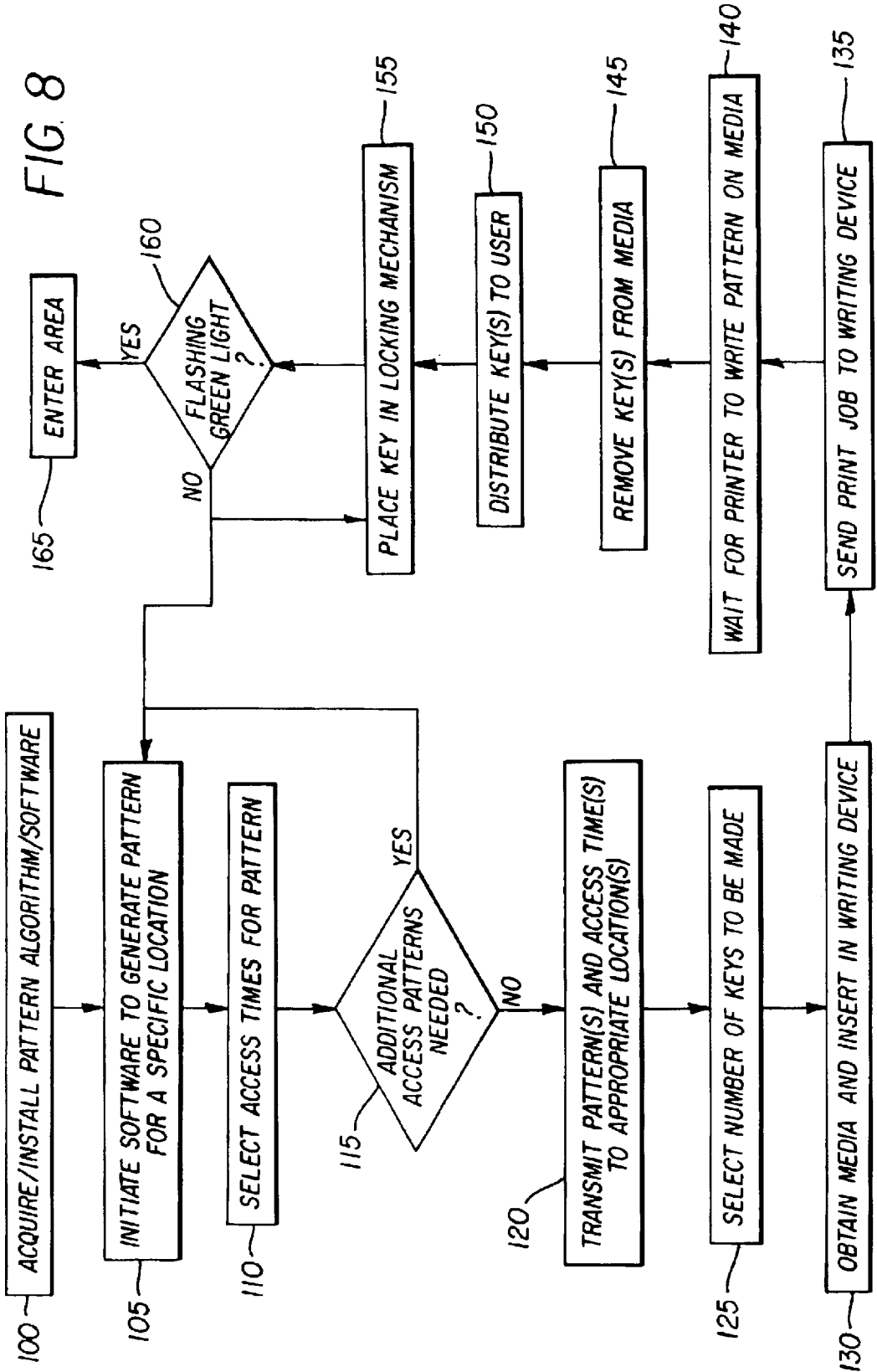
FIG. 8 discloses a flow chart of a method of using the optical key system.

FIG. 8 depicts a flow chart of the optical key system. First, (100) the user, such as a hotel manager, should acquire or install the pattern algorithm or software (30). This can be done from a central server (26) or a personal computer (28) on location. Having a central server (26) would enable the patterns for an entire hotel chain or other franchised establishment, business, association device or area, to be managed at one location, which would eliminate complexity for each franchise as well as increase security for each franchise. Next, (105) a user should initiate the software (30) to generate a digital pattern (31). This can be done at the server (26) location or via the PC (28). If additional patterns are necessary (115), for different entry points, he should enable the software (30) to generate more patterns as necessary, indicating (110) how long and/or which hours of the day each pattern should be active. For example, a hotel patron may need access to a conference room, an exercise room and a computer room, as well as to his hotel room. Each access point may cost an additional fee, or have certain hours of operation, so each corresponding pattern would be active accordingly. Each pattern should be sent (120) to the appropriate location (e.g., PC, writing device, locking mechanisms) in a secure manner. This transmission will be described in FIG. 9. The user should indicate (125) how many copies of the key (5) should be made. He should then select (130) a multi-layer material (7) from which to create the key(s) and place the media in a thermal printer or other writing device (35) appropriate to the invention. The print job can now be sent (135) to the thermal printer (35). Once (140) the printer (35) has transferred the unique pattern(s) (12) to the multi-layer material (7), the user should remove (145) the key(s) (5) from the media. For example, the key area may not necessarily equal the area of the multi-layer material (7) sheet. The sheet may be placed into a perforating device so that the key may be separated from the excess film. Or, scissors could be used to trim excess material. The writing device (35) could also be designed to write one key (5) at a time, at a specific size. The key (5) needs to be of adequate size relative to the locking mechanism (40), so that 1) the key fits within the locking mechanism slot (47) and 2)the pattern area (10) is in line with the light source (50) and optical sensor (50) so that the pattern (12) can be accurately read. Once the key is appropriately sized, it can be distributed (150) to the intended user, such as a hotel patron. The patron can access his hotel room by placing (155) the key (5) into the slot (47) of the locking mechanism (40). If the key's pattern (12) is appropriate for that particular locking device (40), an indicator, such as a green light, or a sound, may let the user know (160) that the lock has been deactivated. The user can now enter (165) the area to which he or she has just gained access. If the lock is not deactivated, the user may need to obtain a new key at step 105.

The user may also want to be able to create a "master" key. For example, in a hotel, room service or catering service personnel may need access to the hotel rooms, as well as the room patron. If the locking mechanism (40) were programmed to accept both a unique pattern, as well as a master pattern, hotel personnel would have access to rooms with only one optical key. The process of creating the master key would be the same as above, only the pattern would be different. This pattern could allow access at only certain times of the day or night, during typical working hours. It could also change daily or weekly, depending on the hotel's needs.

Figure 9:
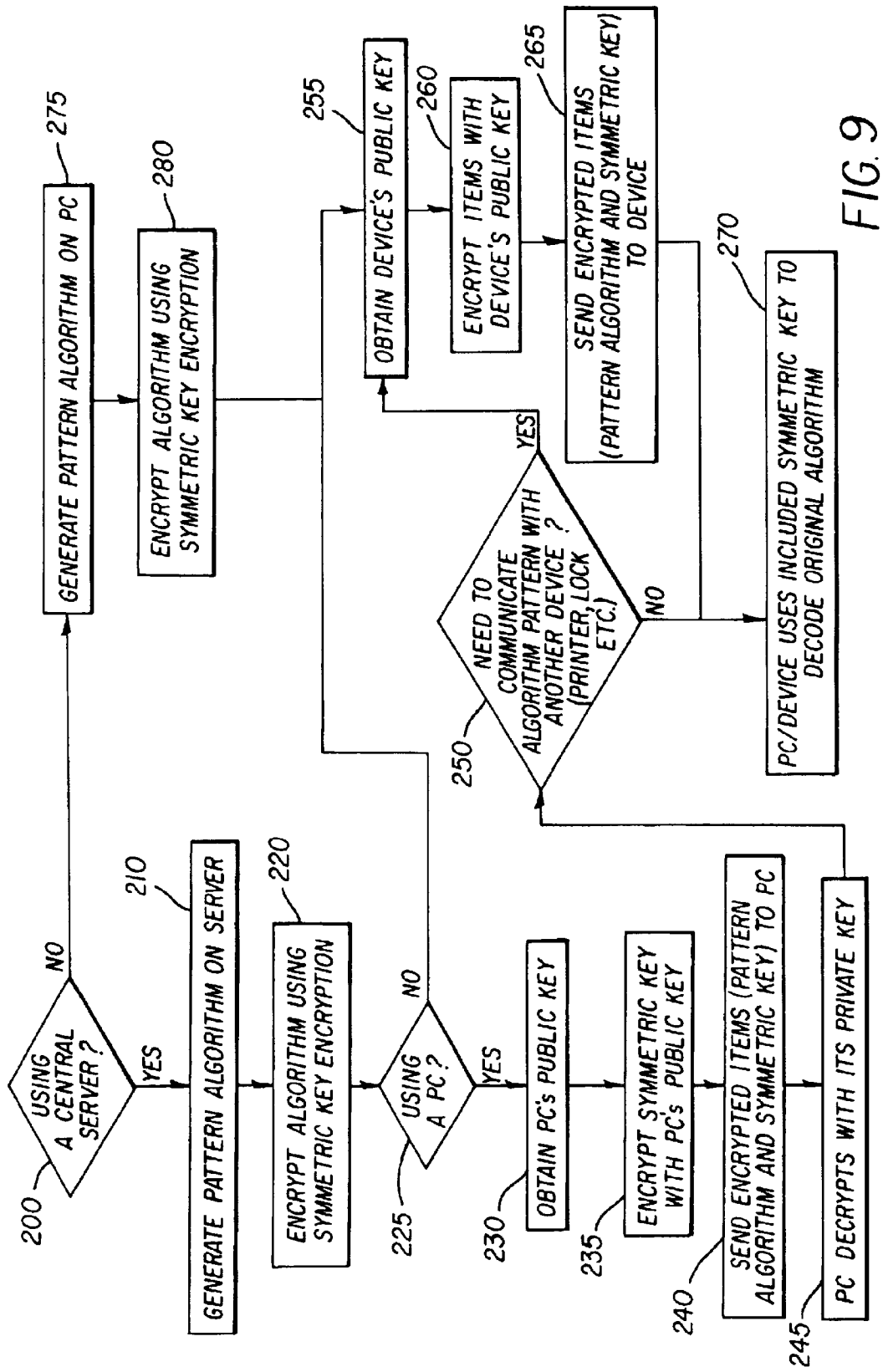
FIG. 9 discloses a flow chart of a method of encrypting the pattern for transmission to various devices in the system.

FIG. 9 describes the transmission of the pattern algorithm using public and private key encryption. At step (200) the system determines if a centralized server (27) is being used. If yes, the digital pattern (31) at step (210) is generated on the server. It should then be encrypted at step (220) using symmetric key encryption. At step(225) it is determined if a PC is being used and if yes, the digital pattern (31) is to be sent to a PC (28), or any other device, the server (27) should obtain at step (230) that device's public key. At step (235), the encrypted algorithm and corresponding symmetric key with the device's public key. The server (27) at step (240) would these send the encrypted items to the appropriate device. At step (245) using its private key, the device would decrypt the items and use the symmetric key to decode the symmetric algorithm. At step (250) it is determined that there is a need to commute the algorithm pattern with another device. If not, the destination device at step (270) could decode the original algorithm. If (200) the system was not using a central server, it would generate at step (275) the pattern (31) algorithm on a PC (28) and go through similar encryption steps 250, 255, 260 and 265 (which correspond to steps 220, 230, 235 and 240 respectively) to securely transmit the pattern (31).

Aside from hotels, the optical keys could be useful in numerous arenas. They could allow admittance to theme parks or certain rides within the park, to households, to automobiles, to sporting events or concerts, or any other secure or ticketed area. The optical key receiver (locking mechanism) (40) could be programmed not only with a certain code but during certain hours. It can also be color-specific.

It is to be understood that various modifications and changes may be made without departing from the present invention, the present invention being defined by the following claims.

PARTS LIST

5 Key
7 Multi-layer material
8 Key Information
10 Patterned Area of Key
11 Orienting Markers
12 Pattern
13 Additional Pattern
15 Diffuse Area
16 Voided diffuser Layer
17 Varying degrees of specularity
19 Lenses
20 Support layer
21 Micro-voids
23 Non-voided Layer
24 Closed Voids
25 Reflective Layer
26 Dye Receiving Layer
27 Central Server
28 Computer
30 Software
31 Digital pattern
32 Device Connection
33 Fluorescent dye pixel
34 Alternate fluorescent dye pixel
35 Writing Device
36 Fluorescent layer
37 Writing Head
40 Lock
45 Micro-processor
47 Slot
50 RF Transmitter/Hardwire Connection
52 Light source
55 Optical sensor
60 Light
61 Unique light pattern
62 Optical pattern signal
100 Acquire/Install Pattern Algorithm/Software
105 Initiate Software to Generate Pattern for a Specific Location 110 Select Access Times for Pattern
115 Additional Access Patterns Needed?
120 Transmit Pattern(s) and Access Time(s) to Appropriate Location(s)
125 Select Number of Keys to be Made
130 Obtain Diffusion Film for Writing Device
135 Send Print Job to Writing Device
140 Wait for Printer to Write Pattern on Film
145 Remove Key(s) from Diffusion Film Sheet
150 Distribute Key(s) to User
155 Place Key(s) in Locking Mechanism
160 Flashing Green Light?
165 Open Door
200 Using a Central Server?
210 Generate Pattern Algorithm on Server
220 Encrypt Algorithm Using Symmetric Key Encryption
225 Using a PC?
230 Obtain PC's Public Key
235 Encrypt Symmetric Key with PC's Public Key
240 Send Encrypted Items to PC
245 PC Decrypts with its Private Key.
250 Need to Communicate?
255 Obtain Device's Public Key
260 Encrypt Items with Device's Public Key
265 Send Encrypted Items to Device
270 PC/Device uses Included Symmetric Key to Decode Original Algorithm
275 Generate Pattern Algorithm on PC
280 Encrypt Algorithm Using Symmetric Key Encryption

What is claimed is:

1. A security card comprising:
   a support substrate having a lens layer disposed thereon, said support substrate having a substantially uniform light transmitting characteristic, said lens layer having a predetermined pattern area formed thereon such that when light is transmitted through said support substrate and said lens layer a unique pattern is produced that can be read from the light passing there through wherein said lens layer comprises micro-lenses.

2. A system according to claim 1 wherein said support substrate comprises a transparent polymeric film.

3. A security card according to claim 1 wherein said micro-lenses are convex.

4. A security card according to claim 3 wherein said micro-lenses occur with average frequency between 110 and 1080 micro-lenses per mm.

5. A security card according to claim 4 wherein each of said micro-lenses have an average width in the range of about 2 to 20 microns in the x and y directions.

6. A security card according to claim 4 wherein each of said micro-lenses have an average width in the range of about 3 to 8 microns in the x and y directions.

7. A security card according to claim 1 wherein a dye is provided to said pattern.

8. A security card according to claim 1 wherein a reflective layer is provided on said micro-lenses.

9. A security card according to claim 1 wherein said micro-lens are made of a polymer.

10. A security card according to claim 1 wherein said support substrate comprises a transparent polymeric film.

11. A security card comprising:
    a support substrate having a diffuse layer disposed thereon, said support substrate having a substantially uniform light transmitting characteristic, said diffuse layer having a predetermined pattern area formed thereon such that when light is transmitted through said support substrate and said diffuse layer a unique pattern is produced that can be read from the light passing there through, said diffuse layer comprises a plurality of micro voids each having a volume less than about 100 microns.

12. A security card according to claim 11 wherein said micro voids each comprise voids having it major to minor axis is between 2.0 and 0.5.

13. A security card according to claim 11 wherein said micro voids comprise between 2 and 60% by volume of said diffuse layer.

14. A security card according to claim 11 wherein said micro voids comprise between 30 and 50% by volume of said diffuse layer.

15. A method for forming a unique pattern on a security card having a support substrate a diffuse layer disposed over said support substrate, said support substrate having a substantially uniform light transmitting characteristic, comprising the steps of:
    creating a unique pattern on said diffuse layer by modifying the index of refraction of said diffuse layer in said unique pattern, said modifying of said index of refraction is accomplished by the application of heat to said diffuse layer.

16. The method according to claim 15 wherein said application of heat is provided by a thermal print head.

17. The method according to claim 16 wherein said thermal print head also applies a dye to said unique pattern.

18. The method according to claim 15 wherein said modifying of said index of refraction is accomplished by the application of heat.

19. A system for controlling access to a user, said system comprising:
    a database for maintaining a plurality of unique security patterns each unique security pattern associated with a designated security card, each security pattern having a designated permission;
    a security card having support substrate having a diffuse layer disposed over said substrate, said substrate having a substantially uniform light transmissive characteristic, said diffuse layer being modified in accordance with one of sad associated unique security patterns, said security card is designed such that when light is transmitted through said substrate and said diffuse layer said associated unique security pattern can be read wherein said diffuse layer comprises micro-lenses;
    a for reading said security card if an associated unique pattern is present; and
    a computer system for taking said information read from said reader and comparing it with said information in said database to determined if the read associated unique pattern read will be allowed access.

20. A system according to claim 19 wherein a dye is provided to said unique security pattern.

21. A system according to claim 19 further comprising a printer for creating said security card, said printer having means for creating said unique security pattern on said diffuse layer.

22. A system according to claim 21 wherein said particular wave length light comprises infra red.

23. A system according to claim 21 wherein said micro-lenses are convex.

24. A system according to claim 21 wherein said micro-lenses occur with average frequency between 110 and 1080 micro-lenses per mm.

25. A security card according to claim 21 wherein each of said micro-lenses have an average width in the range of about 2 to 20 microns in the x and y directions.

26. A system according to claim 21 wherein each of said micro-lenses have an average width in the range of about 3 to 8 microns in the x and y directions.

27. A system according to claim 21 wherein a reflective material is provided on said micro-lenses.

28. A system according to claim 21 wherein said micro-lens are made of a polymer.

29. A system according to claim 19 wherein said security card is designed to be read with a particular wave length light.

30. A security card comprising:
   a support substrate having a lens layer disposed thereon, said support substrate having a substantially uniform light transmitting characteristic, said lens layer having a predetermined pattern area formed thereon such that when light is transmitted through said support substrate and said lens layer a unique pattern is produced that can be read from the light passing there through wherein said lens layer comprises micro-lenses, wherein said micro-lenses occur with average frequency between 110 and 1080 micro-lenses per mm.

31. A system for controlling access to a user, said system comprising:
   a database for maintaining a plurality of unique security patterns each unique security pattern associated with a designated security card, each security pattern having a designated permission;
   a security card having support substrate having a diffuse layer disposed over said substrate, said substrate having a substantially uniform light transmissive characteristic, said diffuse layer being modified in accordance with one of sad associated unique security patterns, said security card is designed such that when light is transmitted through said substrate and said diffuse layer said associated unique security pattern can be read wherein said diffuse layer comprises micro-lenses;
   a for reading said security card if an associated unique pattern is present; and
   a computer system for taking said information read from said reader and comparing it with said information in said database to determined if the read associated unique pattern read will be allowed access wherein said designated permission for a security card comprises authorized access for a limited period of time.

32. A system for controlling access to a user, said system comprising:
   a database for maintaining a plurality of unique security patterns each unique security pattern associated with a designated security card, each security pattern having a designated permission;
   a security card having support substrate having a diffuse layer disposed over said substrate, said substrate having a substantially uniform light transmissive characteristic, said diffuse layer being modified in accordance with one of sad associated unique security patterns, said security card is designed such that when light is transmitted through said substrate and said diffuse layer said associated unique security pattern can be read;
   a for reading said security card if an associated unique pattern is present; and
   a computer system for taking said information read from said reader and comparing it with said information in said database to determined if the read associated unique pattern read will be allowed access wherein said diffuse layer comprises micro voids each having a volume less than about 100 microns.

33. A security card according to claim 32 wherein said micro-voids comprise between 2 and 60% by volume of said diffuse layer.

34. A security card according to claim 32 wherein said micro-voids comprise between 30 and 50% by volume of said diffuse layer.

35. A security card according to claim 32 wherein said micro-voids each comprise voids having it major to minor axis is between 2.0 and 0.5.

* * * * *

UNITED STATES PATENT AND TRADEMARK OFFICE
CERTIFICATE OF CORRECTION

PATENT NO. : 6,908,035 B2  Page 1 of 1
DATED : June 21, 2005
INVENTOR(S) : Amy L. Bench et al.

It is certified that error appears in the above-identified patent and that said Letters Patent is hereby corrected as shown below:

Column 12,
Line 40, "sad" should read -- said --.
Line 46, "a for reading said security card if an associated unique" should read -- for reading said security card if an associated unique --.
Line 50, "determined" should read -- determine --.

Column 13,
Line 32, "sad" should read -- said --.
Line 38, "a for reading said security card if an associated unique" should read -- for reading said security card if an associated unique --.

Column 14,
Lines 3 and 26, "determined" should read -- determine --.
Line 17, "sad" should read -- said --.
Line 22, "a for reading said security card if an associated unique" should read -- for reading said security card if an associated unique --.

Signed and Sealed this

Fourth Day of April, 2006

JON W. DUDAS
*Director of the United States Patent and Trademark Office*